(12) United States Patent
Nikolskii et al.

(10) Patent No.: US 6,325,307 B1
(45) Date of Patent: *Dec. 4, 2001

(54) METHOD FOR PRODUCING POWDER FROM POLYMERIC MATERIAL AND DEVICE FOR ITS REALIZATION

(75) Inventors: Vadim Gennadjevich Nikolskii; Dmitrii Alekseevich Gorkov; Vladimir Nikolaevich Baliberdin; Mikhail Rafailovich Rubinshtein, all of Moscow; Igor Ivanovich Khaliavin, Yoshkar Ola; Liudmila Borisovna Aleksandrova, Moscow; Galina Pavlovna Mashinskaya, Moscow; Valerii Arkadjevich Rudoy, Moscow, all of (RU)

(73) Assignee: Gaia International, LLC, Barrington, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/532,615
(22) PCT Filed: Feb. 7, 1995
(86) PCT No.: PCT/FI95/00052
  § 371 Date: Feb. 7, 1996
  § 102(e) Date: Feb. 7, 1996
(87) PCT Pub. No.: WO95/21047
  PCT Pub. Date: Aug. 10, 1995

(30) Foreign Application Priority Data
  Feb. 7, 1994 (RU) .................................................. 94004110
(51) Int. Cl.$^7$ .................................................. B02C 19/22
(52) U.S. Cl. .............................. 241/23; 241/65; 241/260.1
(58) Field of Search .................................. 241/65, 66, 67, 241/247, 23, 260.1

(56) References Cited
U.S. PATENT DOCUMENTS

| 4,607,796 | 8/1986 | Enikolopow et al. . |
| 4,607,797q | 8/1986 | Enikolopow et al. . |

(List continued on next page.)

FOREIGN PATENT DOCUMENTS

| 412 294 | 11/1966 | (CH) . |
| 4217316 | 11/1993 | (DE) . |

(List continued on next page.)

OTHER PUBLICATIONS

Claims of SU 1213612 (Norplast Sci. Prodn. Assoc.) and English Translation thereof.

(List continued on next page.)

*Primary Examiner*—Mark Rosenbaum
(74) *Attorney, Agent, or Firm*—Smith, Gambrell & Russell, LLP

(57) ABSTRACT

The method for producing powder from polymeric material includes its heating and subsequent grinding by action of pressure and shearing at values from 0.5 to 50 at simultaneous cooling. The distinction of the method is that heating is carried out up to 30–250° C. in two stages: firstly, at a pressure increasing from 0.1–0.5 MPa to 3–100 MPa and, secondly, under isobaric conditions at shearing 0.3–10 during 0.3–5 sec, and said grinding is performed as the pressure is decreased down to 0.1–0.5 MPa. The device for producing powder from polymeric material comprises a grinding chamber having a casing (2) and a grinding rotor (3) in a shape of a body of revolution with an annular clearance (4) towards the inner surface of the casing. The distinction of the device is that it is equipped with a compacting chamber, disposed in alignment with and prior to the grinding chamber, said compacting chamber being designed as a cylindrical casing (8) accommodating a compacting screw (9) with helical channels at its side surface, the depth of said channels being gradually reduced towards the grinding chamber. The purpose of the compacting screw (9) is to convey the material towards the grinding chamber. In the zone between the compacting screw (9) and the grinding rotor (3) a ring-shaped boring (5, 22) 1–8 mm in depth in its shallow section is cut.

27 Claims, 2 Drawing Sheets

U.S. PATENT DOCUMENTS

Figure 1:
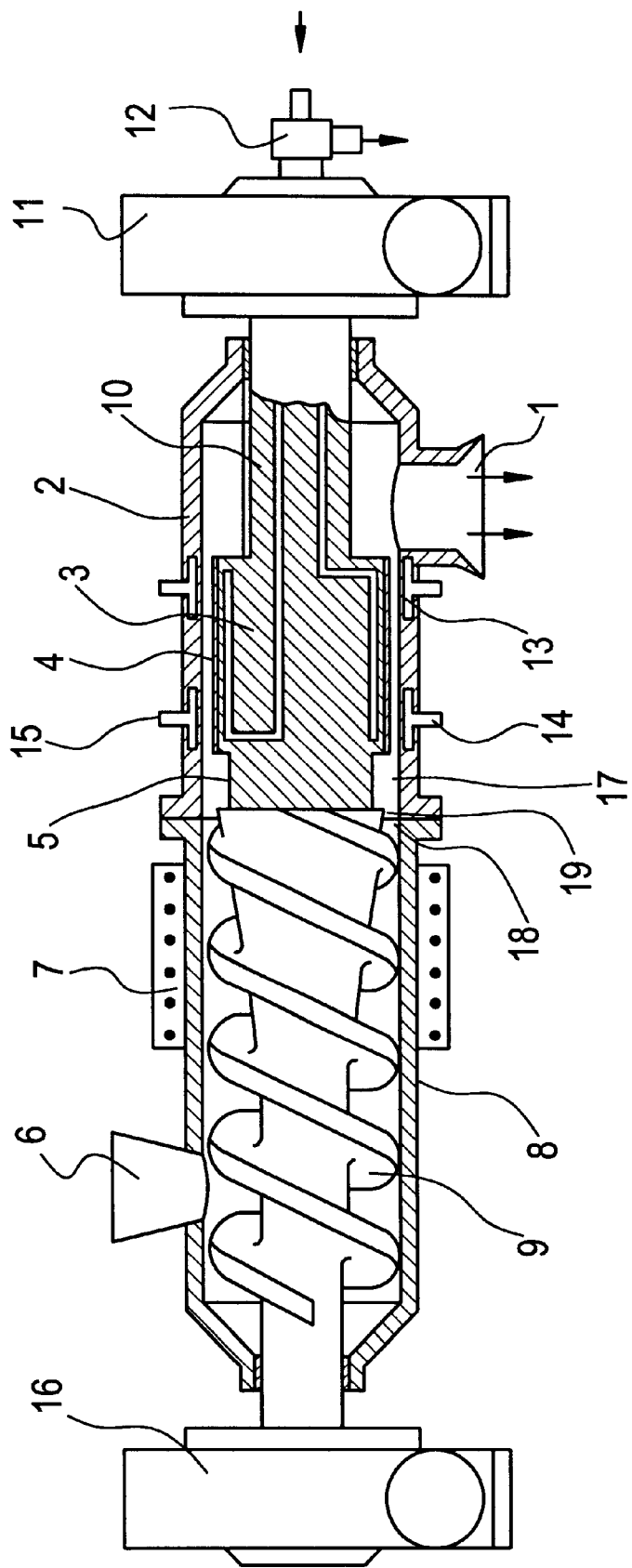

| | | |
|---|---|---|
| 5,395,055 | 3/1995 | Shutov . |
| 5,397,065 | 3/1995 | Shutov . |
| 5,415,354 | 5/1995 | Shutov . |
| 5,566,888 * | 10/1996 | Yamamoto ........................ 241/23 X |
| 5,704,555 | 1/1998 | Arastoopour . |
| 5,769,335 | 6/1998 | Shutov . |

FOREIGN PATENT DOCUMENTS

| | | |
|---|---|---|
| 528 246 | 2/1993 | (EP) . |
| 529 187 | 3/1993 | (EP) . |
| 1469293 | 3/1989 | (SU) . |
| 1548188 | 3/1990 | (SU) . |

OTHER PUBLICATIONS

Text, drawing, and English translation of SU, 1120587 (Norplast Res. Prodn. Assoc.).

* cited by examiner

METHOD FOR PRODUCING POWDER FROM POLYMERIC MATERIAL AND DEVICE FOR ITS REALIZATION

The inventions relate to the field of grinding of materials, particularly, to the methods and devices for producing powder from polymeric material and can be applied to grinding of natural and synthetic polymeric materials in the form of friable crumb, scrap, fibers, real silk, and ultra-high-modulus fiber, among others.

It is known a prior art process [A. A. Blagonravova, A. I. Nepomniashii "Lacquered epoxy resins", "Khimia", Moscow, 1972, pp. 207–208.] for producing polymer powders including the mixing of components of a polymer composition at temperature providing the formation of a melt, and at pressure of 0.3–50 MPa, the cooling of a melt down to solidification temperature and subsequent grinding to the powdery state. With this process initially coarse crushing for achieving the particle size not more 3 mm, is carried out, and followed by the mechanical fine grinding, by impact, for instance. This process allows to produce powders from brittle materials, which can be transferred into molten state. However, many of the materials (lint, high-strength fibers of real silk etc., for instance) cannot be transferred into molten state. Besides, the process is unsuitable for the materials with high viscoelastic properties.

Also a device is known for producing powder from polymeric materials [Patent of Switzerland 412294, Cl.a,1/12.] which comprises a casing having therein a cylindrical chamber, a grinding rotor being mounted coaxially within said chamber. Between a side surface of a grinding rotor and an internal surface of a cylindrical chamber a grinding zone is positioned. The grinding rotor is provided with grinding means of cutting and impact type, whereas the surface of the chamber is constructed with triangular shape longitudinal grooves, which have small orifices for the passage of a powder. The casing is provided with inlet and outlet openings.

The device does not allow to produce powder from natural leather, foamed polyurethane, high-modulus and ultra-high-modulus fibers, as the design of the device does not provide the mechanical densification of these materials, the latter being a necessary condition for their disintegration.

It is known a method [Inventor's certificate of U.S. Ser. No. 1213612, Int.CI B 29 B 1/12, Bull.Inv. N41–2, 1993, p.195] for producing powders from thermoplasts including the heating of thermoplasts up to temperatures 3–40° C. lower than that of their softening, accompanied by subsequent action of pressure (0.5–100 MPa) and shearing (0.5–50) during simultaneous cooling down to temperatures 3–600 lower than that of a heating.

The method allows to produce fine powders from polyethylene and some other thermoplasts with relatively low energy consumption. However, pulverization of elastic materials, such as high-strength fibers of real silk, aromatic polyamides, cotton and some other high-strength polymers with reasonably loose structure as well as monolithic elastic materials is not feasible. These materials are of high elasticity that hinders or rules out their crushing and grinding under the action of pressure and shearing. Besides, the heating of polymeric materials with low heat conductivity using external heat sources cannot be realized fast enough, resulting in reduction of productivity of a grinding process.

The device for producing powder from polymeric material is known [Inventor's certificate of U.S. Ser. No. 1120587, Int.CI B 29 B 1/12.Bull.Inv. N41–42, 1993, p.195] which comprises casing with inlet and outlet openings. Within the casing a rotor in a shape of a body of revolution with annular clearance towards the inner surface is located, between end faces of a rotor and casing a radial-circular slot being formed, which communicates with the annular clearance. The device is provided with cooling means of rotor and/or the inner surface of the casing, and in the zone of the radial-circular slot it is provided with a heating member of casing. The inlet opening of the device is hermetically joined to the casing.

Said device provides the preparation of fine powders from low density polyethylene and some other polymer thermoplasts as well as their composites. The melt of these thermoplasts easily penetrates into the circular slot between rotor and casing and forms during cooling a reasonably monolithic solid material, in the interior of which high shear stresses are realized, leading to its crushing and grinding. At the same time, said device gives no way to grind virtually all kinds of polymers with fibrous and porous structure, thermoplastic ones, such as twisted fosta nylon, for instance, and non-thermoplastic as well. To introduce this type of materials into an annular clearance of said device is a very difficult task, and these materials which possess poor heat conductivity and low elasticity, are heated too slowly, being introduced into the clearance, through the external heat sources and, furthermore, in the interior of the material only slight, if any, shear stresses are realized. Because of it these materials are just conveyed lengthwise of the clearance towards outlet, i.e. by-passing the grinding stage.

An object of the present inventions is the development of a highly efficient method allowing to produce powder from polymeric material with loose and fibrous structure, as well as from monolithic materials, which are in elastic state, in particular, and also an apparatus design through which this method could be realized.

The solution of this task is attained by applying a method for producing powder from polymeric material, including its heating and subsequent grinding under the action of pressure and shearing from 0.5 up to 50 at simultaneous cooling. In said method the heating Is effected up to temperatures 30–250° C. in two stages, namely, initially at a pressure increasing from 0.1–0.5 MPa up to 3–100 MPa, and afterwards under isobaric conditions at shearings 0.3–10 during 0.3–10 sec; grinding is performed as the pressure is decreased to 0.1–0.5 MPa.

The solution of the task is attained also by applying a device for producing powder from polymeric material comprising a grinding chamber which is designed as a casing provided with inlet opening and discharging hopper, a grinding rotor having a shape of a body of revolution with annular clearance towards the inner surface of the casing is mounted coaxially within said casing, the device being provided with cooling means of rotor and/or of the casing. Said device is equipped with a compacting chamber, disposed in alignment with and prior to the grinding chamber, said compacting chamber being designed as a cylindrical casing with charging hopper and outlet opening, and with a compacting screw with helical channels at its side surface, the depth of said channels being gradually reduced towards outlet opening, said compacting screw being mounted within the casing of compacting chamber in order to convey the material towards the grinding chamber. At the side surface of said compacting screw, at its end, positioned near outlet opening of compacting chamber, and/or at the side surface of said grinding rotor, at its end, positioned near inlet opening of said grinding chamber, a ring-shaped boring 1–8 mm in depth in its shallow section is cut. The compacting screw is butt-jointed with said grinding rotor with the possibility of their independent or cooperative rotation, or said compacting screw is made integral with said grinding rotor.

The term shallow section is used in reference to that region of the ring-shaped boring, where it is of a minimum depth. The inner side surface of the compacting chamber and/or grinding chamber in the zone of the ring-shaped boring can be designed with bosses and/or hollows, in the shape of longitudinal grooves or ribs, for instance.

At the inner surface of the grinding chamber casing two threads in the shape of helical channels with constant and/or variable depth are performed, including forward threading cutted in one direction, and counter threading cutted in the opposite direction, the latter intersecting repeatedly with said forward threading. The helical channels can be designed therewith in a triangular or rectangular, or trapezoidal or rounded shape, their depth being constant or increasing towards the discharging hopper.

The casing of the compacting chamber can be equipped with a heating member. The helical channels at the surface of grinding rotor can be designed in a triangular or rectangular, or trapezoidal or rounded shape, their depth therewith can be constant or increasing towards the discharging hopper.

In a design of the device it is conceivable that all helical channels at the surface of a grinding rotor, and helical channels at the surface of a compacting screw near its end adjoining grinding chamber, are of an equal depth, coinciding with that of the ring-shaped boring.

The diameter of the inlet opening of the grinding chamber casing may be equal to the inner diameter of the compacting chamber casing. The casing of the compacting chamber and the casing of the grinding chamber in the zone of the ring-shaped boring may be additionally provided with a heating element.

Furthermore, the inner surface of the compacting chamber casing may be provided with longitudinal ribs and/or grooves. The ring-shaped boring may be designed in a conical or cylindrical shape.

This is the installation design that offers the prospect of a step-by-step heating, i.e. initially the heating is carried with pressure increasing, and then under isobaric conditions and under the action of shearing, with the subsequent grinding of a material during its cooling and decreasing of pressure under the simultaneous action of pressure and shearing.

By this means the effect of pressure and shearing on a polymeric material, when grinded by the proposed method, occurs already during its heating, being in progress in two stages, beginning from 30° C. At the first stage the material is subjected to progressive squeezing with pressure increasing; as this takes place, voids and micropores existing in the material decrease in size, and the air presented in these voids and micropores is gradually excluded from the bulk of the material. As a result, the heat conductivity of the material increases and its heating-up accelerates. The action of shearings which are realized at the second stage of heating, when the density of the material is already high enough, gives rise to an even greater extent for the material to become more monolithic one, and also increases substantially its rigidity and brittleness. Under shearing the intensive heat release begins through the whole bulk of the material being processed, causing its rapid warming-up. A polymeric material heated under these conditions is destroyed efficiently and is grinded on subsequent cooling under the action of shearing and pressure, gradually reducing down to 0.1–0.5 MPa. In so doing it has been possible to produce highly dispersed polymeric powders with relatively low energy consumption even when the initial polymeric material is rich in aromatic polyamide fibers, ultra-high-modulus fibers of the "Kevlar"—type, real silk, cotton, twisted fosta nylon filaments, or consists totally of these fibers and filaments.

The fact that the device is designed with a ring-shaped boring at the side surface of compacting screw and/or grinding rotor, at their ends facing each other, comprises a peculiar kind of an annular compression chamber restricted by the walls of a ring-shaped boring and by the internal side surface of the casing of the compacting chamber and/or grinding chamber, disposed opposite to the bottom of the boring. A material entering into this annular compression chamber from helical grooves of a compacting screw is subjected to strong shearing, due to which it is rapidly warmed up, becomes simultaneously more monolithic one, and is pressed out gradually into the annular clearance of the grinding chamber. As a result, the materials with the Initial fibrous or loose, microporous structure such as real silk, natural leather, foamed polyurethane etc. are efficiently destroyed and dispersed in the annular clearance.

The embodiment with bosses and/or hollows on the inner side surface of the casing of compacting chamber and/or grinding chamber over the ring-shaped boring, in the shape of longitudinal grooves, for instance, favours the increase in a shear stress value in a material to be processed and, as a consequence, makes this material all the more monolithic. In this case it is possible to grind even such high-strength materials as ultra-high-modulus fibers ("Kevlar"), carbon fibers, twisted fosta nylon filaments, etc.

The presence at the inner surface of the casing of the grinding chamber of two threads in a shape of helical channels, including forward threading cutted in one direction, and counter threading cutted in the opposite direction, intersecting repeatedly with said forward thread, contributes to finer grinding of the above-numerated and of some other high-strength materials.

The presence of longitudinal ribs, grooves, and threads in a shape of helical grooves at the inner surface of the compacting chamber casing favours more efficient compacting of the material to be processed and, as a consequence, its more efficient grinding. This effect is most pronounced on grinding of such elastic materials as rubber, and also on grinding of very loose, cotton-like materials.

The design of the compacting screw jointed to the grinding rotor with the possibility of independent rotation and provided with the independent rotary means, allows to subject the material located in the annular compression chamber to combined action of shear stresses in two different directions, facilitating thus the rapid heating, formation of a monolith (occurrence of a high enough continuity of the material) and the destruction of the material. This widens additionally the variety of the materials to be grinded.

Figure 2:
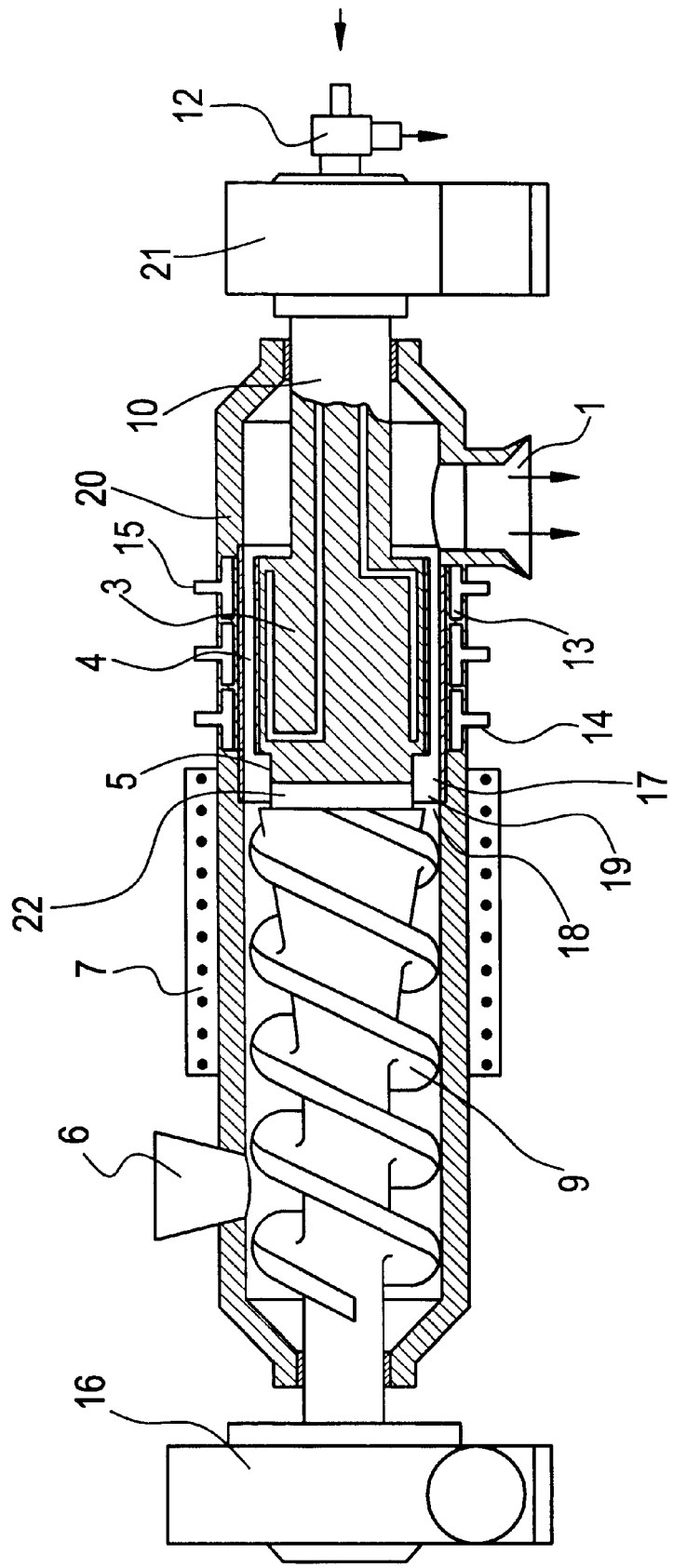

The invention is described in the following in more detail with reference to the accompanying drawings, where FIG. 1 shows a longitudinal sectional view of the proposed device, in which the grinding chamber casing is jointed rigidly and hermetically with coaxially mounted compacting chamber casing, and the compacting screw is jointed with grinding rotor with a possibility of their independent rotation and is provided with independent rotary means, and FIG. 2 shows a longitudinal sectional view of the proposed device, in which the compacting chamber casing is made integral with the grinding chamber casing and the compacting screw is jointed with the grinding rotor with a possibility of common rotation and they have a common drive.

The device shown in FIG. 1 comprises, provided with a discharging hopper 1, a casing 2 of the grinding chamber, wherein the grinding rotor 3 is disposed, mounted with the formation of annular clearance 4 towards the inner surface of the casing 2. At the side surface of the grinding rotor the triangular-shaped helical channels are arranged, and at the end of the rotor disposed alongside the inlet opening 19 of the grinding chamber, a ring-shaped boring 5 is arranged. The end of said rotor 3 is jointed with a compacting screw 9 with the possibility of independent rotation, said screw being bulged out from a casing of a compacting chamber 8 provided with a charging hopper 6 and a heating element 7. At the side surface of the screw 9, helical channels are cutted, whose depth gradually reduces towards the grinding rotor, and the said channels are arranged in such a manner as to provide the feed of a material from the charging hopper towards grinding rotor 3. The casing of the compacting chamber 8 is jointed through the outlet opening 18 rigidly and hermetically with the inlet opening 19 of the grinding chamber casing 2 by means of flanges. The grinding rotor 3 is connected by hollow shaft with a drive 11. The cooling of the grinding rotor 3 is performed due to circulation of liquid coolant through the channels arranged in the interior of rotor and a rotor shaft 10 and connected to the unit 12 for inlet and outlet of a liquid coolant. The casing 2 of the grinding chamber is also provided with cooling means, arranged in a shape of two flow-through annular chambers 13 with the connection points 14 and 15 for feeding and outlet of a cooling fluid. The compacting screw 9 is connected with an independent drive 16. The end of the compacting screw forms together with the ring-shaped boring of the grinding rotor 3 and side surface of the casing 2 an annular compression chamber 17, within which the material to be processed is subjected to intensive shearing and rapid heating under compression conditions.

The device in FIG. 2 comprises a casing 20, representing the compacting chamber casing made integral with the grinding chamber casing. Casing 20 is provided with the charging hopper 6, heating element 7, and discharging hopper 1. Within the casing the grinding rotor 3 is disposed, mounted with the formation of the annular clearance 4 towards the inner surface of the casing, and the compacting screw 9 jointed with the grinding screw with the possibility of common rotation. Said compacting screw is connected with the drive 16. The cooling of grinding rotor 3 is performed due to circulation of liquid coolant through the channels arranged in the interior of the rotor fixed into the bearing 21 and shaft 10. Said channels are connected to the unit 12 disposed in the exterior of the casing providing the inlet and outlet of the liquid coolant. The casing 20 is also provided with cooling means, arranged in a shape of three flow-through annular chambers 13 with the connection points 14 and 15 for inlet and outlet of a cooling fluid. At the side surface of compacting screw 9 the helical channels are cutted, whose depth gradually reduces towards the grinding rotor 3 (i.e. towards the outlet opening of the compacting chamber 18), whereas in the section contiguous to the end jointed with the grinding rotor 3, (i.e. at the end of compacting screw 9 disposed alongside the outlet opening 18), a ring-shaped boring 22 is arranged. At the side surface of the grinding rotor 3, helical channels in a rectangular shape are cutted, whereas in the section contiguous to the end jointed with the compacting screw 9 end (i.e. alongside the inlet opening of the grinding chamber 19) the ring-shaped boring 5 is arranged. Said ring-shaped borings 5 and 22 form together with the inner surface of the casing 20 the annular compression chamber 17, within said chamber the polymeric material is subjected to intensive shearing and rapid heating under compression conditions. At the inner surface of the casing 20 limiting the annular clearance 4 and annular compression chamber 17 two threads in a shape of helical channels are arranged, including forward threading cutted in one direction, and counter threading cutted in the opposite direction, the latter intersecting repeatedly with said forward threading.

The normal operation of the device is illustrated (using the device presented in FIG. 2 as an example) with the case of fine grinding of wastes of natural leather. The wastes of natural leather subjected to previous coarse crushing in a rotary crusher down to 10–20 mm in size, begin to charge at a steady rate into charging hopper 6 of the casing 18. In so doing the drive 16 provides the rotation of the compacting screw 9 and grinding rotor 3 with a constant speed of 50 revolutions per minute (rpm). The temperature of the casing 20 at the mounting seat of the heating element 7 is held at the level of about 35–40° C. A material charged in the hopper 6, is catched by helical channels of the compacting screw 9 and, being subjected to gradual compression and heating, is transported by the screw 9 into the annular compression chamber 17. At the initial stage, while still the compression chamber 17 is party fulled, the material entering into said chamber is not subjected to substantial shearing and, as a consequence, is unaffected by noticeable compacting and heating. In this case only small amount of the material entering the compression chamber feeds from it into annular clearance 4, wherein the material is partially disintegrated, and afterwards pours out from the discharging hopper 1 in a shape of moderately coarse particles. The throughput of the device is extremely poor at this step. Just as the annular compression chamber 17 is filling up with the leather pieces, so pressure, shear stress, and temperature of a material begin rapidly to increase. The fast compacting of a polymer occurs, its rapid heating-up proceeds, and the amount of leather feeding from the compression chamber 17 into the annular clearance 4 per unit time, wherein the leather is now disintegrated to finer particles, gradually grows. Eventually, within one-five minutes the grinding starts, high-efficient steady-state operating conditions of producing powdery leather are attained, whereby the amount of fine powder produced per unit time becomes equal to that of the initial material feeding into the charging hopper 6.

On grinding under steady-state operating conditions the pieces of natural leather catched by helical channels of screw 9 during transportation towards annular compression chamber 17 are subjected to heating up to 30–40° C. together with pressure increasing up to 10–20 MPa. In this case the main amount of air presented in voids of the leather is forced out of it, the density of the leather increases, and the air forced out of the leather is removed from the device, through charging hopper 6, for instance. Being entered into the annular compression chamber 17, leather is subjected to rapid heating to about 60–80° C. and additional compacting due to action of shearing and heat release induced thereby.

Duration of stay of leather in the compression chamber 17 may last from tenth parts of a second to few seconds. On longer standing of the leather in the chamber 17 noticeable changes in its molecular structure are observed.

Leather initially subjected to heating under compression conditions, and then to action of shearing, enters from the compression chamber 17 into the annular clearance 4, where its rapid grinding at simultaneous cooling down to 25° C. and pressure reducing down to 0.1 MPa occurs. In this case powder is coming out from the discharging hopper 1, which after its screening on a sieve with a screen size of 3 mm gives a residue of about 10 wt %.

Several factors are contributing to achieve an efficient grinding of polymers processed in the proposed device. Among them can be mentioned a high degree of compactness of material produced during its being in the compression chamber 17, and also heating of materials in this chamber up to the most favourable temperature, at which the energy consumption for its crushing and grinding are sharply reduced. Specifically, during grinding of natural leather in the steady-state operating conditions the temperature in the chamber 17 achieves 60–90° C. On grinding of waste of low-density polyethylene film in the compression chamber 17 the temperature of 85–100° C. is maintained, for foamed polyurethane this temperature is equal to 80–120° C., for natural silk fibers—to 100–140° C., for rubber waste—140–170° C., etc. The employment of cooling means of the casing 20 and grinding rotor 3 allows to avoid over-heating of the grinded material.

The device presented in FIG. 1, operates in a similar way. However, the presence of independent drive 16 of compacting screw 9 in this device allows to vary over a wide range the operating conditions of shearing of a polymer in the annular compression chamber 17, and thereby makes possible the grinding of a wide variety of polymeric materials.

EXAMPLE 1

Fibers or textile scrap of a real silk cutted to length of 3–5 cm are steadily fed with a speed of 10 kg per hour into the charging hopper of the device presented in FIG. 2, the diameter of the compacting screw and the grinding rotor jointed with it being equal to 140 mm. The rotation of the screw and rotor is performed by means of a common drive with a speed of 50 rpm. A material is initially heated up to 60° C. at pressure increasing from 0.1 MPa up to 25 MPa, and then is heated up to 110° C. at constant pressure and shearing value of 3 during 5 sec. Afterwards the material is subjected to shearing equal to 10 at pressure decreasing down to 0.1 MPa and cooling down to 40° C. As a result, a slightly lumping powder is produced which, being screened on a sieve with a screen size of 0.63 mm gives the residue of about 5 wt %.

EXAMPLES 2–9

The process is carried out as in Example 1. Designation of the material to be grinded, the operating conditions of the process by steps, together with the relative shearing values, as well as the characteristics of the produced powder are given in the Table.

The method for producing powder from polymeric material and the device for its realization allow to bring about a high-performance process with relatively low energy consumption, that enables to produce highly dispersed powder from a wide variety of polymeric materials, those with loose and fibrous structure, among them, as well as monolithic (solid) materials in elastic state.

TABLE

| | Material | Feeding speed, kg per hour | Heating — First stage Temperature, ° C. | Heating — First stage Interval of pressure increase, MPa | Heating — Second stage Temperature, ° C. | Heating — Second stage Shearing | Heating — Second stage Time, sec | Grinding Shearing | Grinding Cooling temperature, ° C. | Pressure decrease down to . . . , MPa | Characterization of powder Sieve Screen size, mm | Characterization of powder Sieve residue weight % | Comment |
|---|---|---|---|---|---|---|---|---|---|---|---|---|---|
| 1 | Shred of real silc | 10 | 60 | 0.1–25 | 110 | 3 | 5 | 10 | 40 | 0.1 | 0.63 | 5 | |
| 2 | Polyamide fiber | 11 | 80 | 0.2–30 | 150 | 3 | 2 | 30 | 50 | 0.1 | 0.63 | 5 | Fiber waste previously cutted to 5–10 cm in size |
| 3 | UHM fiber (Kevlar) | 7 | 40 | 0.1–50 | 130 | 4 | 4 | 15 | 30 | 0.4 | 0.63 | 10 | Fiber waste cutted to 10—10 cm in size |
| 4 | Organic plastics waste | 10 | 60 | 0.3–35 | 140 | 3 | 3 | 12 | 30 | 0.1 | 0.63 | 5 | Precrushing to 1–3 cm in size |
| 5 | Carbon plastics waste | 15 | 60 | 0.2–70 | 150 | 10 | 3 | 40 | 25 | 0.1 | 0.63 | 5 | Precrushing to to 2–3 cm in size |
| 6 | Rubber scrap | 25 | 60 | 0.1–15 | 145 | 5 | 0.8 | 30 | 60 | 0.5 | 0.63 | 30 | |
| 7 | Carbon fiber waste | 6 | 120 | 0.1–100 | 250 | 10 | 10 | 50 | 130 | 0.3 | 0.63 | 3 | |
| 8 | Leather waste | 5 | 20 | 0.1–25 | 30 | 3 | 5 | 10 | 20 | 0.1 | 3 | 10 | |
| 9 | LDPE granules | 18 | 40 | 0.5–3 | 90 | 0.3 | 0.3 | 0.5 | 57 | 0.3 | 0.63 | 2 | |

What is claimed is:

1. Apparatus for producing powder from polymeric material comprising:

a grinding casing provided with an inlet opening and a discharging outlet;

a grinding chamber in said casing;

a grinding rotor mounted coaxially within said casing, said grinding rotor being shaped as a body of revolution and being spaced by a clearance from the inner surface of the casing;

a compacting casing with a compacting chamber located therein, said compacting chamber being aligned with and located prior to said grinding chamber, said compacting chamber having a charging inlet and an outlet opening;

a compacting screw in said compacting chamber, said compacting screw having helical channels which have a depth which is gradually reduced toward the outlet opening; and, a ring shaped recess of a predetermined depth at at least one of the following locations:
  in the compacting screw, near the outlet opening of the compacting chamber;
  in the grinding rotor, near the inlet opening of the grinding casing.

2. Apparatus according to claim 1, comprising:
  means including said compacting screw for heating the polymeric material to a temperature of 30–250° C. during first and second stages;
  means including said compacting screw for increasing the pressure of the polymeric material from 0.1–0.5 MPa to 3–100 MPa during the first stage;
  means for maintaining isobaric conditions for a predetermined time during the second stage;
  means including said compacting screw for exerting shearing forces on the material during the second stage; and,
  means including said grinding rotor for grinding the material after the second stage while decreasing its pressure down to 0.1–0.5 MPa.

3. Apparatus according to claim 2 wherein the predetermined time is 0.3–10 seconds.

4. Apparatus according to claim 1 wherein at least one of said chambers has an inside surface provided with circumferentially discontinuous projections which face inwardly toward said ring shaped recess.

5. Apparatus according to claim 1 wherein the grinding chamber has an interior surface provided with two threads in the shape of helical channels, one thread being a forward thread directed in one direction, the other thread being a counter thread directed in an opposite direction, said forward thread and said counter thread intersecting each other repeatedly.

6. Apparatus according to claim 5 wherein the helical channels of the grinding chamber have depths which are constant.

7. Apparatus according to claim 5 wherein the helical channels of the grinding chamber have depths which increase toward the discharging outlet.

8. Apparatus according to claim 1 wherein helical channels of the grinding chamber are provided on the surface of the grinding rotor.

9. Apparatus according to claim 8 wherein the helical channels of the grinding chamber have depths which are constant.

10. Apparatus according to claim 8 wherein the helical channels of the grinding chamber have depths which increase toward the discharging outlet.

11. Apparatus according to claim 1 wherein the compacting chamber and the inlet opening of the grinding chamber have equal diameters.

12. Apparatus according to claim 1 including a heating member located near said ring-shaped recess.

13. Apparatus according to claim 1 wherein the compacting chamber has an internal surface provided with longitudinal ribs.

14. Apparatus according to claim 1 wherein the compacting chamber has an internal surface provided with longitudinal grooves.

15. Apparatus according to claim 1 wherein the ring-shaped recess has a conical shape.

16. Apparatus according to claim 1 wherein the ring-shaped recess has a cylindrical shape.

17. Apparatus according to claim 1 including means for cooling the grinding chamber.

18. Apparatus according to claim 1 including means for cooling the grinding rotor.

19. Apparatus according to claim 1 wherein the grinding rotor is rotationally fixed to and simultaneously rotatable with the compacting screw.

20. Apparatus according to claim 1 wherein the grinding rotor and the compacting screw are separately formed and independently rotated.

21. Apparatus for producing powder from polymeric materials, comprising:
  means for heating the polymeric materials to a temperature of 30–250° C. during first and second stages;
  means for increasing the pressure of the polymeric material from 0.1–0.5 MPa to 3–100 MPa during the first stage,
  means for maintaining isobaric conditions for a predetermined time during the second stage;
  means for exerting shearing forces on the material during the second stage; and,
  means for grinding the material after the second stage while decreasing its pressure down to 0.1–0.5 MPa.

22. A method of producing powder from polymeric materials, said method including the steps of:
  heating the polymeric materials to a temperature of 30–250° C. during first and second stages;
  increasing the pressure of the polymeric material from 0.1–0.5 MPa to 3–100 MPa during the first stage,
  maintaining isobaric conditions for a predetermined time during the second stage;
  exerting shearing forces on the material during the second stage; and,
  grinding the material after the second stage while decreasing its pressure down to 0.1–0.5 MPa.

23. The method of claim 22 wherein the shearing forces are applied under isobaric conditions for 0.3–10 seconds.

24. The method according to claim 22 wherein the grinding step is performed by exerting shearing forces on the material.

25. The method according to claim 22 wherein the material is cooled during the grinding step.

26. The method according to claim 22 wherein the polymeric material is a member selected from the group consisting of leather, polyethylene film, foamed polyurethane, natural silk fibers, rubber, carbon fiber, carbon plastic and polyamide fibers.

27. A method of producing powder from a polymeric material comprising:
  heating the polymeric material to an elevated temperature during a first stage;
  increasing the pressure on the polymeric material from 0.1–0.5 Mpa to 3–100 Mpa during the heating in the first stage, to thereby gradually exclude any air present in said polymeric material;
  maintaining isobaric conditions for a predetermined time during a second stage with continued heating;
  exerting shearing forces on the polymeric material during the second stage; and,
  grinding the material after the second stage while decreasing its pressure down to 0.1–0.5 Mpa.

* * * * *